United States Patent Office.

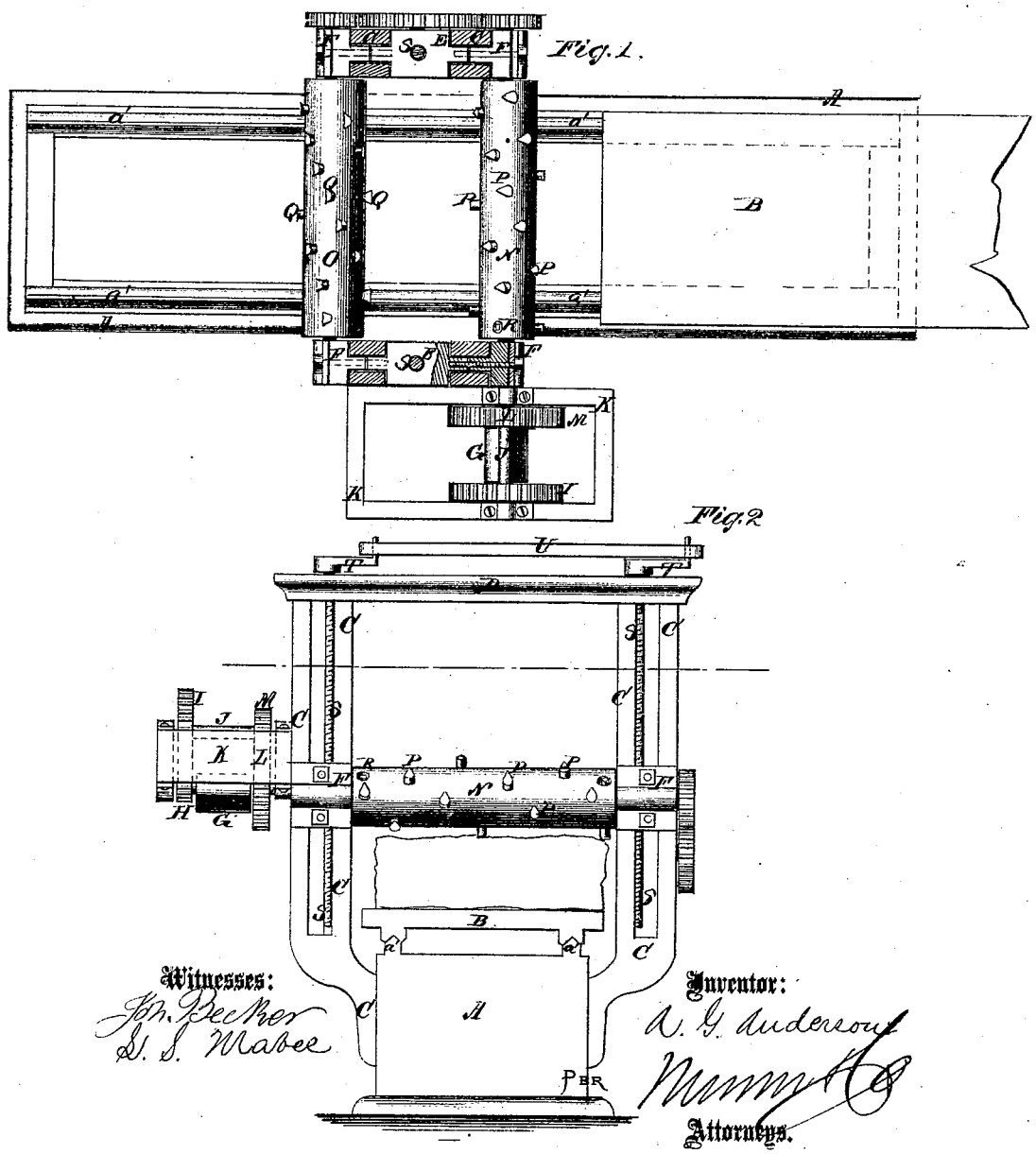

ALEXANDER G. ANDERSON, OF QUINCY, ILLINOIS, ASSIGNOR TO HIMSELF AND A. W. ANDERSON.

Letters Patent No. 105,159, dated July 12, 1870.

IMPROVEMENT IN MACHINE FOR DRESSING STONE.

The Schedule referred to in these Letters Patent and making part of the same.

To all whom it may concern:

Be it known that I, ALEXANDER G. ANDERSON, of Quincy, in the county of Adams and State of Illinois, have invented a new and useful Improvement in Machine for Dressing Stone; and I do hereby declare that the following is a full, clear, and exact description thereof, which will enable others skilled in the art to make and use the same, reference being had to the accompanying drawing forming part of this specification, in which—

Figure 1 is a horizontal section of my improved machine, taken through the line x x, fig. 2.

Figure 2 is end view of the same.

My invention has for its object to furnish an improved machine for dressing marble and other stone, which shall be simple in construction and effective in operation, doing its work uniformly and well; and It consists in the construction and combination of the various parts of the machine, as hereinafter more fully described.

A is the foundation-frame of the machine, upon which are formed or to which are secured the ways a', upon which the bed B is moved back and forth to feed the stone to the cutters.

The bed B may be moved and adjusted by any of the ordinary means for such purposes, and should have a number of holes formed in it, to receive the clamps by which the stone to be dressed is secured in place.

To the middle parts of the sides of the foundation-frame A is secured the lower ends of the two side frames C, the upper ends of the four uprights of each of which are connected to each other, and secured in their proper relative positions by the top frame D.

E are blocks, placed in the space between the four uprights of the two side frames C, and which move up and down upon said uprights.

F are the boxes in which the journals of the cutter-shafts revolve, and which are secured to the opposite sides of the blocks E by bolts, so that, by tightening up the nuts of the said bolts, the block E and boxes F, when adjusted to the proper position, may be securely clamped to the frame C.

G is a pulley, around which passes the driving-belt, and with which is securely and rigidly connected a small gear-wheel, H.

The pulley G and gear-wheel H work loosely upon the projecting journal of one of the cutter-shafts.

The teeth of the small gear-wheel H mesh into the teeth of the large gear-wheel I, attached to the short shaft J, which revolves in bearings in the frame K, attached to one of the blocks E, and to which is also rigidly attached the small gear-wheel L, the teeth of which mesh into the teeth of the large gear-wheel M, rigidly attached to the journal of one of the cutter-shafts.

By this arrangement of gearing, the rapidity of motion will be lessened, and the power increased in the same proportion, causing the cutter-shafts to revolve at a slow rate of speed, and with great power.

N is the forward, and O is the rear cutter-shaft, to which are respectively attached the cutters P and Q. The cutters P, which first operate upon the stone, are made pointed, and similar to the tool used by the workman for rough work, when dressing the stone by hand.

Q are the rear cutters, the cutting-edges of which are made broad and flat, and which are so arranged that the path or cut of each following cutter may overlap that of the preceding one.

The shanks of the cutters P Q enter the shafts N O, and are secured in place by set-screws R, as shown in figs. 1 and 2.

The cutters P Q are made of chilled iron, or may have diamond carbon faces, and are arranged in spiral rows upon the shafts N O, so that, in cuts not more than four inches deep, not more than four cutters will be cutting at the same time.

S are long screws, passing through and swiveled to the top plate or frame D, and which pass through the centers of the blocks E, through screw-holes formed in or through nuts secured to said blocks E, so that, by turning the said screws in one or the other direction, the blocks E, and with them the cutter-shafts N O, may be raised or lowered, to adjust them at any desired distance above the bed-plate B.

Upon the upper ends of the swiveled screws S are formed, or to them are attached cranks T, by which the said screws may be operated, and which cranks may be connected by a connecting-bar, U, so that the cutter-shafts may be kept exactly horizontal while being raised and lowered.

Having thus described my invention,

I claim as new and desire to secure by Letters Patent—

The reciprocating carriage B, combined with two revolving cutter-stocks, N O, of which the first has pointed tools P, and the last broad flat tools Q, arranged to act successively upon the stone, in the manner and for the purpose described.

ALEX. G. ANDERSON.

Witnesses:
J. M. CYRUS,
T. J. MITCHELL.